UNITED STATES PATENT OFFICE.

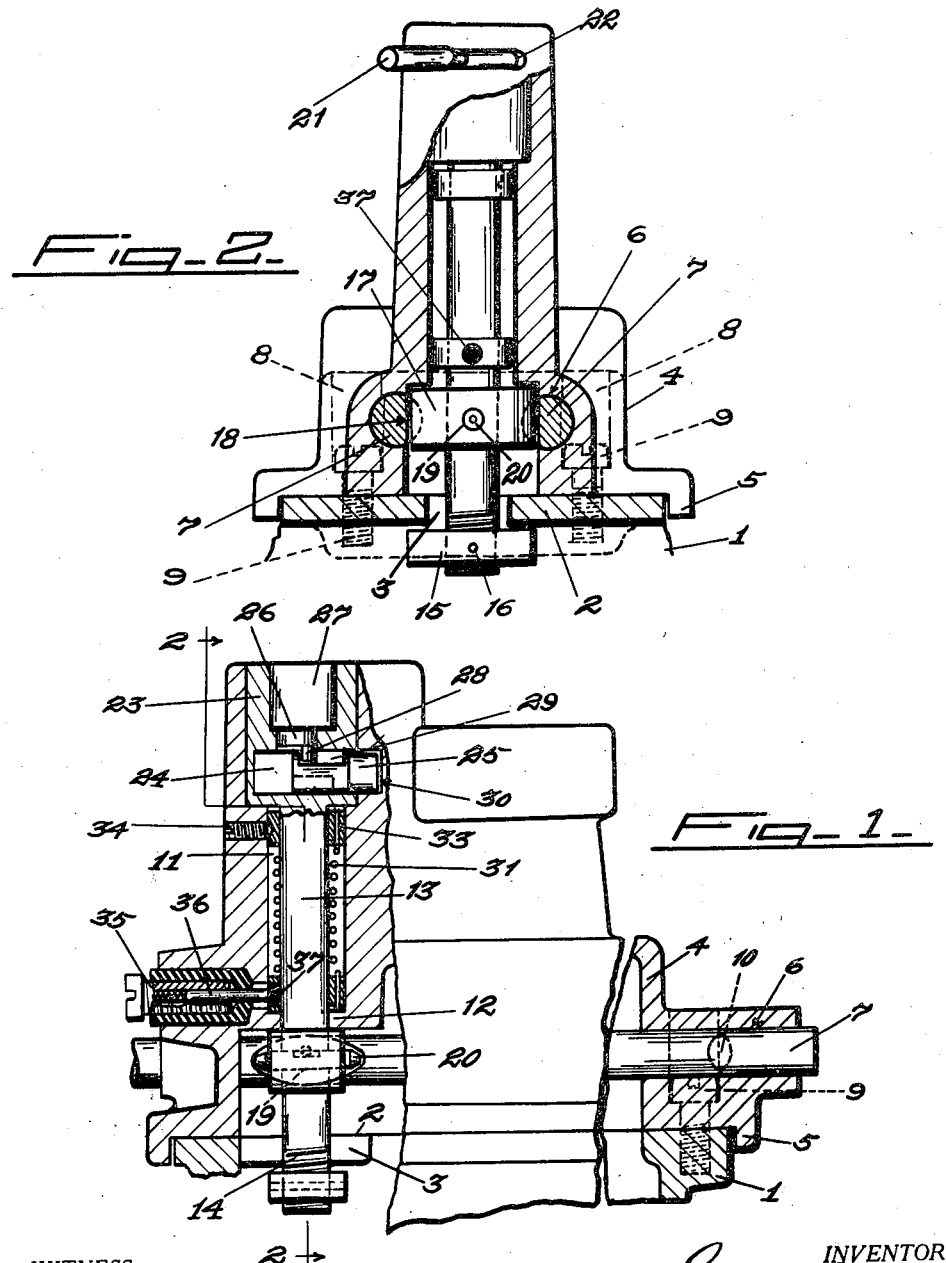

GEORGE C. JENSEN, OF OAKLAND, CALIFORNIA.

SHIFTER-DEVICE LOCKING AND INTERLOCKING BOLT.

1,290,752. Specification of Letters Patent. Patented Jan. 7, 1919.

Application filed August 8, 1918. Serial No. 248,866.

*To all whom it may concern:*

Be it known that I, GEORGE C. JENSEN, a citizen of the United States, residing at Oakland, in the county of Alameda and State of California, have invented certain new and useful Improvements in Shifter-Device Locking and Interlocking Bolts, of which the following is a specification.

The present invention relates to a construction for locking the shift devices of a motor vehicle transmission from operative movement by unauthorized persons, and also to the locking of the transmission case cover onto the case to prevent unauthorized persons from tampering with the transmission mechanism when the same is in its locked position.

The principal object of this invention is to provide a construction of the type set forth carried by the transmission case cover and in the form of an axially rotatable bolt capable of operation to prevent operative movement of the shifter devices, also to provide an interlocking means therefor which prevents the operative movement of one shifter device when the other is moved from its normal position. A further object is to provide a construction whereby the locking of the shifter devices from operative movement prevents the removal or detachment of the means for securing the cover to the case.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in side elevation, partly in vertical section, of the preferred embodiment of my invention.

Fig. 2 is a broken sectional view taken on lines 2—2 of Fig. 1.

Referring more particularly to the drawings, wherein like characters of reference designate corresponding parts, 1 indicates a suitable transmission gear case in which are adapted to be mounted the usual transmission drive gears of a motor vehicle. The upper open end of the case 1 is provided at one end with the inwardly projecting flanges 2 separated from each other to form a slot 3. A cover 4 rests on and closes the open top of the gear case 1, the same being provided with the annular flange 5 for concealing the meeting edges of the cover and case, and preventing the insertion of an instrument therebetween for the prying of the cover from the case when the cover is locked thereon.

The opposite end walls of the cover are each provided with a pair of cylindrical openings 6, in which are mounted for longitudinal movement shifter devices 7 illustrated in the form of rods, the movement of which, by any suitable mechanism, as, for example, by the well known shift lever, causes a shifting of the transmission gears within the case 1.

At one end wall the cover is provided with the vertical bores 8 intersecting one edge of the openings 6 formed in said wall, and through said bores 8 are adapted to be positioned the headed retaining screws 9 which have threaded engagement with the upper edge of the transmission case 1, the shifter devices 7 being provided with notches 10 which admit of the passage of the headed screws through the bores 8 when said notches 10 are in line with the openings. However, on the positioning of the shifter devices, as in Fig. 1, the notches 10 are out of register with the bores 8, positioning the solid portion of the shifter devices over the headed ends of the screws 9, thus preventing the withdrawal of the same and the separation of the cover from the case at this end.

The cover is formed at its opposite end with a vertical bore 11 passing between the shifter devices 7 and formed at its lower end with an inwardly extended flange 12. Axially rotatable within said bore 11 is a locking bolt 13 preferably threaded as at 14 at its lower end and carrying thereon a nut 15 which after being adjusted is pinned or held to rotate with the bolt by a suitable pin 16, the nut being oblong in plan and of a width to pass through the opening 3 when in alinement therewith, and when arranged transversely thereof to lie at its opposite ends below the flanges 2.

The bolt 13 is provided in the region of said shifter devices 7 with an oblong portion 17 lying in a plane parallel with the nut 15, the ends of said portion adapted when disposed transversely of the devices 7 to be received in stops 18 formed in the opposing surfaces of the shifter devices, thus precluding operative movement of said shifter devices.

Freely movable in a bore 19, disposed transversely of the member 17, is an interlocking pin 20 adapted when the same is disposed in a plane at right angles to the shifter devices 7 to be received at one end in one of the stops 18 on the movement of the stop of the opposing shifter device from a position opposite said first stop, thus precluding movement of one of said shifter devices when the other is moved from neutral position.

The bolt 13 carries at its upper end a laterally disposed operating handle 21 operating through a guide 22 in the wall of the tubular bore 11. The bolt is further provided at its upper end with an enlarged head 23 formed with a transverse opening 24 in which is mounted a spring pressed latch 25, said latch adapted for retracting on the operation of a key controlled barrel 26 mounted in a locking casing 27, said barrel carrying at its lower end a cam 28 operating in a recess 29 in the upper surface of the latch 25.

It will be apparent that on the axial rotation of the bolt 13 to position the nut 15 to lie beneath the flanges 2 and the member 17 to coöperate with the stops 18, the latch 25 will engage at its outer end in a recess 30 formed in the wall of the bore 11, and thus lock the bolt from movement until such time as the barrel 26 is operated by a suitable controlling key inserted in the casing 27. The bolt 13 is automatically rotated from locked to unlocked position on the release of the latch 25 by a suitable spring 31 coiled about the same, and secured at its lower end to a member 32 attached to the bolt, the upper end of said spring being secured to a collar 33 held in the bore 11 from rotation by a set screw 34. If desirable, a suitable contact terminal 35 adapted to receive a connection from the vehicle ignition system, is mounted within the cover, the contact pin 36 of which is adapted when the bolt 13 is in locked position to engage an insulating portion 37 on the collar 32.

By this construction it will be apparent that I have provided a locking bolt adapted when in one position to lock the shifter devices from operative movement and to lock one end of the cover to the transmission casing, said bolt when in unlocked position providing an interlock between the shifter devices, whereby operative movement of one is precluded until such time as the other is brought to neutral position. I have also provided a construction wherein the shifter devices when in locked position preclude the removal of the cover attaching means at the opposite end of the case.

Having thus described my invention, what I claim as new and desire to protect by Letters Patent is:—

1. In combination with a pair of parallel spaced shifter devices each provided with a stop, a locking bolt extended between the same, means carried by the bolt and adapted for movement therewith to engage said stops to lock said shifter devices from operation, and means associated with said bolt and adapted when the same is in its unlocked position for coöperating with said shifter devices to provide an interlock between the same whereby the movement of one is precluded during operative movement of the other.

2. In combination with a pair of parallel spaced longitudinally movable shifter devices each provided with a stop, a locking bolt extended between the same, means carried by the bolt and capable of movement therewith to engage said stops to lock said shifter devices from operation, an interlocking pin carried by said bolt and adapted when the same is in unlocked position to engage said stops and provide an interlock between said devices, whereby one of said devices is precluded from operative movement during the movement of the other.

3. In combination with a pair of parallel spaced longitudinally movable shifter devices each provided with a stop, an axially rotatable locking bolt extended between the same, means carried thereby and adapted on the rotation of said bolt to engage said stops to lock said devices from operative movement, and an interlocking pin carried by said bolt and adapted on the axial rotation of the same at right angles from said locking position to provide an interlock between said devices to preclude operative movement of one device during the operative movement of the other.

4. In combination with a vehicle transmission case, a cover therefor, a plurality of parallel spaced longitudinally movable shifter devices carried thereby and each provided with a stop, a locking bolt carried by said cover and extending between said shifter devices, said bolt provided with an extension adapted for operation on the movement of the bolt to engage said stops to lock said devices from movement and provided with means adapted on the locking of said devices from movement to simultaneously lock the cover to the case, and releasable means for retaining said bolt in its locked position.

5. In combination with a transmission case, a removable cover therefor, a pair of parallel spaced longitudinally movable shifter devices carried by said cover, an axially rotatable locking bolt carried by the cover and extending between said shifter devices and depending into said case, means carried by the bolt and adapted on the axial rotation thereof for engaging said shifter devices to lock the same from movement, means carried by the bolt and adapted on the locking of the shifter devices from movement to lock said cover to the case, and means carried by the bolt and adapted on the release of the same to permit operative movement of the shifter devices to provide an interlock between said devices to preclude operative movement of one of said devices when the other is moved from normal or neutral position.

6. In combination with a transmission case, a removable cover therefor, a pair of longitudinally movable parallel spaced shifter devices carried by said cover, means for attaching one end of the cover to the case, a locking bolt carried by the cover adjacent its opposite end and extended between said shifter devices, an extension carried by said locking bolt and adapted for positioning by the movement of the bolt to lock said shifter devices from operative movement, said devices when in locked position precluding removal of said cover attaching means, said bolt when in locked position adapted for securing the opposite end of the cover to the case, and an interlocking pin carried by the bolt and adapted on the release of the same to coöperate with said shifter devices to provide an interlock between the same whereby movement of one of said devices is precluded during such time as the other is moved from normal position.

7. In combination with a transmission case provided with a slot at one end thereof, a removable cover for said case, a pair of longitudinally movable parallel spaced shifter devices carried by said cover, an axially rotatable locking bolt carried by the cover and extending between said shifter devices and through said slot, means on the lower end of said bolt and adapted for projecting beyond the side of said slot whereby said cover is locked to the case on the axial rotation of the bolt to lock said devices from operative movement, and releasable means for retaining said bolt in its locked position.

8. A locking bolt for operation to simultaneously lock a pair of parallel spaced shifter devices from operative movement and to provide an interlock therefor during the free movement thereof, the same comprising a body member disposed between said shifter devices and provided with an elongated locking portion in the region of said shifter devices, said portion adapted on the movement of said bolt in one direction to engage said devices to simultaneously lock the same from operative movement, and an interlocking pin extending transversely through said elongated portion and adapted on the movement of the bolt to permit operative movement of said shifter devices to provide an interlock between said devices.

9. In combination with a transmission case having a removable cover therefor, a pair of longitudinally movable parallel spaced shifter devices within the same, means for attaching one end of the cover to the case, a locking bolt extending into the case adjacent its opposite end and lying between said shifter devices, said locking bolt adapted for axial rotation to lock said shifter devices from operative movement, said devices when in locked position precluding removal of said cover attaching means, and means carried by the bolt and adapted on the operation of the same to lock said shifter devices from movement for securing the opposite end of the cover to the case.

In testimony whereof I have signed my name to this specification in the presence of a subscribing witness.

GEORGE C. JENSEN.

Witness:
D. B. RICHARDS.